Oct. 11, 1960   R. C. McKEE   2,955,403
HAY HARVESTING MACHINE
Filed Nov. 12, 1958   3 Sheets-Sheet 1

INVENTOR
RUSSELL C. McKEE
BY Frederick C. Bromley
ATTORNEY

Oct. 11, 1960      R. C. McKEE      2,955,403
HAY HARVESTING MACHINE

Filed Nov. 12, 1958      3 Sheets-Sheet 2

INVENTOR
RUSSELL C. McKEE
BY Frederick O. Stanley
ATTORNEY

United States Patent Office 2,955,403
Patented Oct. 11, 1960

2,955,403

HAY HARVESTING MACHINE

Russell C. McKee, Elmira, Ontario, Canada

Filed Nov. 12, 1958, Ser. No. 773,454

Claims priority, application Canada June 25, 1958

3 Claims. (Cl. 56—27)

My invention relates in general to material translating apparatus of the type in which a blower is employed for the movement of material and more particularly concerns a harvesting machine for use on the land such as for hay and straw.

Conventional machines of this kind employ a pick-up device of the rotary class for picking up such material as hay or straw and delivering it to a blower, which in turn, blows it through a discharge duct as the machine travels over the land. The discharge material is received in a receptacle such as that of a wagon. A machine of this kind is also employed for loading hay or straw into stationary receptacles such as a barn in which case the material is forked by an operator into the intake at the rear of the blower so that it may be blown into the discharge pipe by which it is conducted to the barn at any suitable elevation.

The general object of my invention is to provide an improved machine of the kind referred to and one which is not only more efficient but is more facile of use.

A further and important aim of the invention is to provide an improved machine of the kind referred to in which drive belts of the prior art are eliminated as well as ducting and valve arrangements common to such a type of harvester.

According to my invention and by virtue of the novel construction, there is provided a blower fan in which a radial disc on the rotary impeller divides the chamber into two similar sub-chambers which is achieved by arranging the disc intermediate of the width of the impeller. Accordingly, there is supplied a set of blades at the forward side of the blower fan casing and another set at the rear side of the blower fan casing. Thus the two sets are isolated from each other and one set serves as loading blades while the other set serves as unloading blades.

The loading blades operate in the respective sub-chamber which is a loading chamber which communicates with the intake of the front side of the blower fan to which material is delivered by the pick-up apparatus as the machine traverses the land. Consequently, the hay or other material is acted on by the loading blades and elevated through the discharge duct into the portable storage receptacle. The other set of blades referred to as the unloading blades, operate in the respective sub-chamber and when the machine is to be used in an unloading operation, the intake duct belonging to the unloading sub-chamber is opened so that the operator may fork the material into the intake duct whence it is delivered by the unloading blades to the elevated discharge duct, thence into the stationary storage receptacle. Accordingly, it will be manifest that the invention provides a dual purpose or double-acting blower fan which, in itself, requires no change in functioning in the loading operation of the machine or in the unloading operation.

A selected embodiment of the machine is illustrated in the accompanying drawings, in which.

Figures 1, 4:
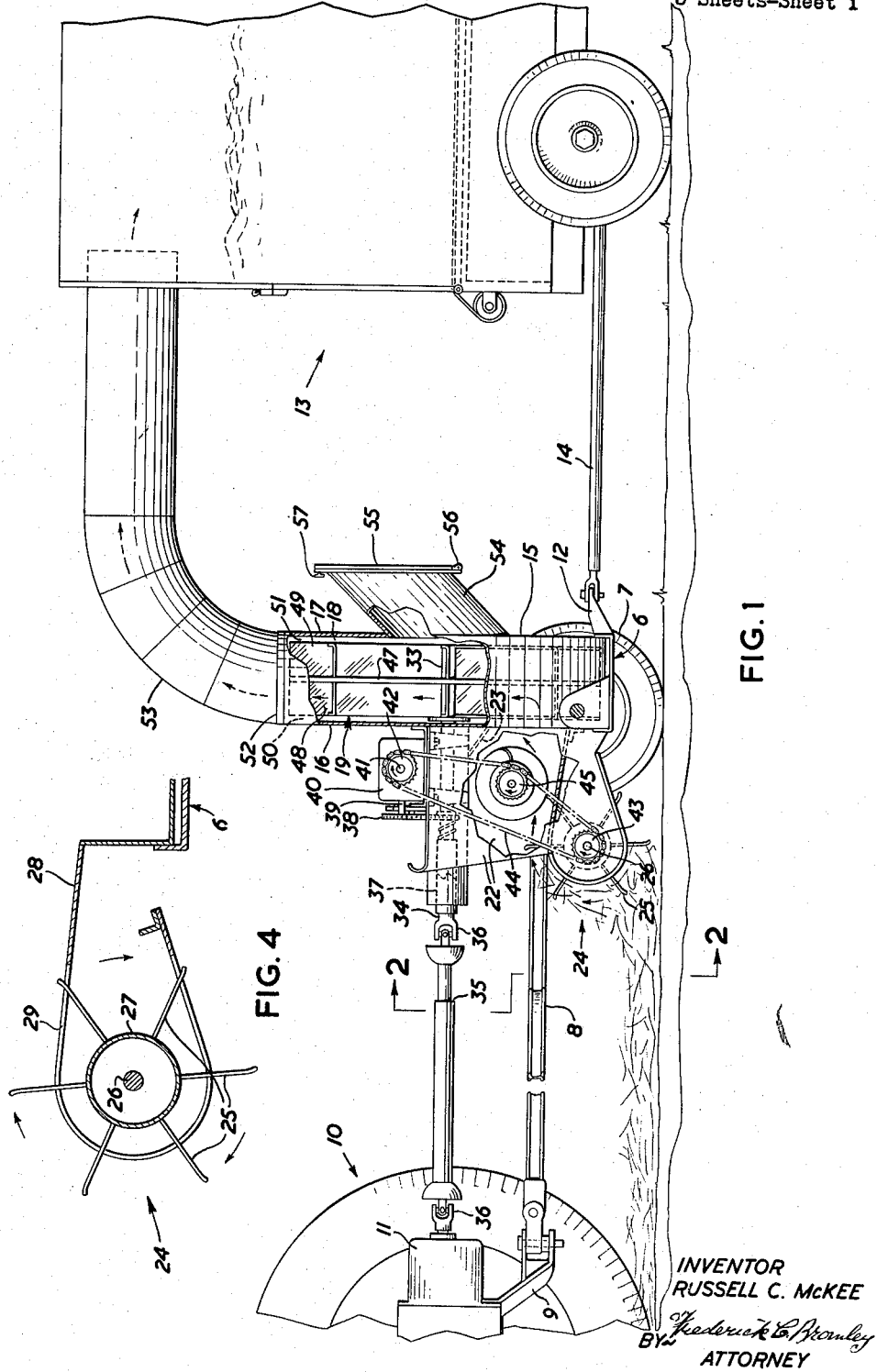
Fig. 1 is a side elevation of a hay harvesting machine as used as a loader and showing the blower fan broken away to disclose the structure of the rotary impeller.
Fig. 4 is a cross-sectional view on line 4—4 of Fig. 2 at an enlarged scale depicting the pick-up fingers on the rotary pick-up device.
Figure 2:
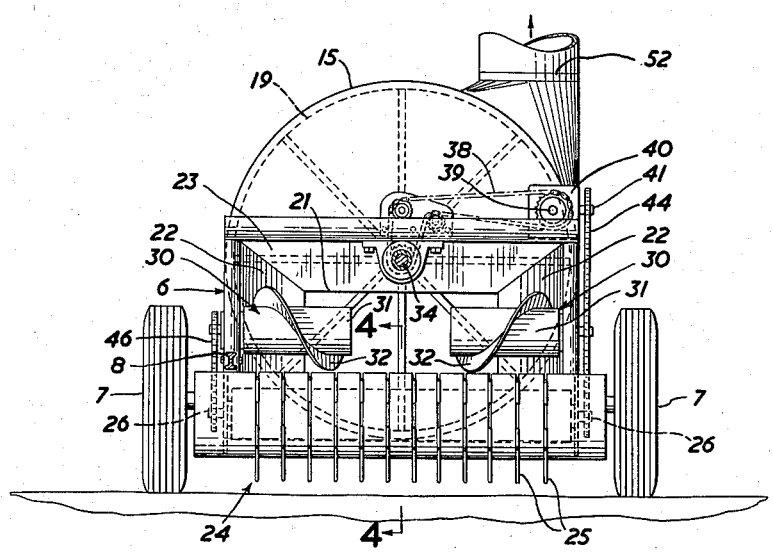
Fig. 2 is a transverse sectional view on line 2—2 of Fig. 1, looking at the front end of the machine.
Figure 5:
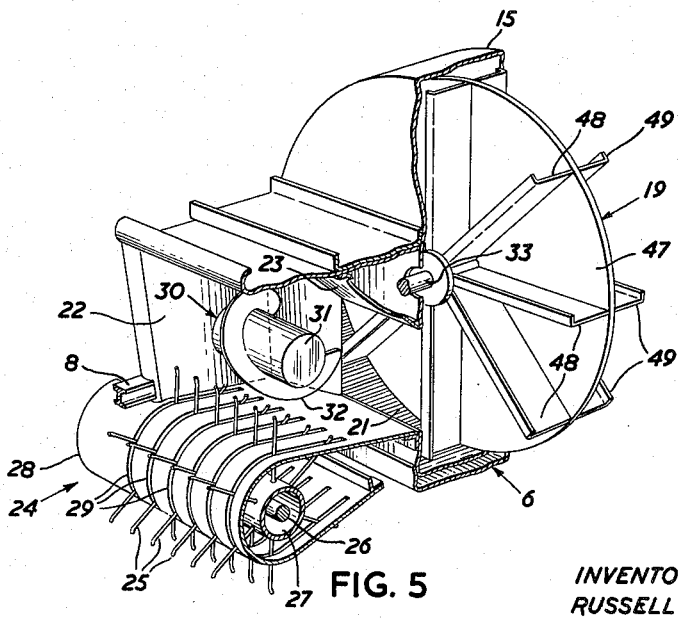
Fig. 5 is a perspective fragmentary view of the machine with portions broken away to and in section show more clearly the rotary impeller structure.

It will be recognized that the general construction of the hay harvesting machine as shown in the drawing by way of example but not of limitation is of a conventional character. It comprises a frame 6 supported on wheels 7 shown as fitted with pneumatic tires. A forwardly projecting tongue 8 connects the wheeled frame to a drawbar 9 of a standard farm tractor indicated at 10. The ordinary power take-off is denoted at 11. The wheeled frame 6 is supplied with a drawbar 12 at its rear in order that the wagon may be hitched to it such as that generally indicated at 13 which provides the portable storage receptacle into which material is delivered in a loading operation, as will be well understood in the art. The wagon has the usual hitch connection indicated at 14. The tongue 8, it will be noted, is at the forward end of frame 6 and drawbar 9 is at the rear end of the frame.

The blower fan has a standard casing indicated at 15 and this is rigidly supported upon the wheeled frame 6 and arranged transversely thereof, so that it presents a front side 16 and a rear side 17 which are part of the enclosing walls of the chamber therein indicated at 18 in which the rotary impeller operates which impeller is generally denoted at 19.

At the front side of the casing 15 there is provided the usual loading intake which communicates with the interior of the blower fan by means of the usual throat opening indicated at 21. There are the usual converging side shields 22 and top shield 23 which lead to a throat or inlet 21 to conduct material into the casing of the blower fan.

As will be readily understood, material such as hay is picked up off the ground by a conventional pick-up device generally denoted at 24 which comprises the spring pick-up fingers 25 radially extending about an axis of rotation supplied by the transverse shaft 26 and the element 27 which rotates therewith. The shield member of the pick-up is indicated at 28 and its slots are denoted at 29 in which the fingers 25 operate. There is, of course, no novelty in this pick-up device and it will be understod that its shaft 26 is journalled in the frame 6 and is driven from the power take-off as will be later dealt with.

To assist the pick-up apparatus, it is desirable to equip the machine with screw conveyors generally denoted at 30 which are disposed over and above the pick-up device and flanking the loading intake, there being one at each side thereof. These spiral conveyors each comprise a hub portion 31 integrated with a helical blade 32. Each screw conveyor is journalled in the frame in any suitable manner on an axis parallel to the axis of the shaft 26 of the pick-up device. It will be understood that the helical blades are reversely arranged so as to feed material into the throat as it is gathered by the pick-up device. The shield 28 of the pickup 24 and side shields 22, 22 and 23 form an enclosure for the screw conveyors 32.

The shaft of the impeller indicated at 33 is connected to the power take-off 11 of the tractor by means of the usual take-off shaft 34 which has the ordinary telescopic sections 35 and the universal joints 36. There is an override device 37 incorporated in the shaft 34 which is conventional.

The trasnmission for the pick-up device and the screw conveyors comprises a chain and sprocket connection 38 for transmitting power from the power take-off shaft 34 to a shaft 39 forming a part of the speed-reduction gearing housed in a box 40 and mounted on the frame 6 with a right angular shaft 41 and driven at a suitable reduction in speed for the purpose of driving the shaft 26 of the rotary pick-up which is affected by the sprockets 42 and 43 in conjunction with the chain 44 which is engaged therewith. Chain 44 also engages a sprocket 45 to drive one of the screw conveyors. The other screw conveyor is driven by a chain and sprocket connection 46 with respect to the shaft 26.

The special construction and arrangement of the rotary impeller 19 will now be dealt with and this is a distinctive feature of the invention. It comprises the provision of a radial dividing disc denoted at 47 which is desirably integral with or secured to the blades of the impeller. This blade-supporting disc is disposed immediately of the width of the rotary impeller with said blades extending outwardly from opposite sides thereof in planes containing the axis of rotation of the impeller and forming two sets of blades isolated from each other by the intervening blade-supporting disc, there being a set of loading blades and a set of unloading blades. The loading blades are denoted at 48 and the unloading blades are denoted at 49. From this it will be manifest that the chamber of the lower fan casing is divided into two similar sub-chambers, one of which may be referred to as a loading sub-chamber and the other as an unloading sub-chamber. It will however be understood that the only division between the two sub-chambers is the intermediate disc of the rotary impeller.

From the foregoing it will be manifest that the loading set of impeller blades 48 operate in the loading sub-chamber denoted at 50 whereas the unloading set of impeller blades 49 operate in the unloading sub-chamber 51. However the discharge opening in the blower fan casing is common to the loading and the unloading sub-chambers and has connected to it as usual the discharge duct such as that indicated at 52 which is elevated and ordinarily includes a flexible elbow element 53.

Figure 3:
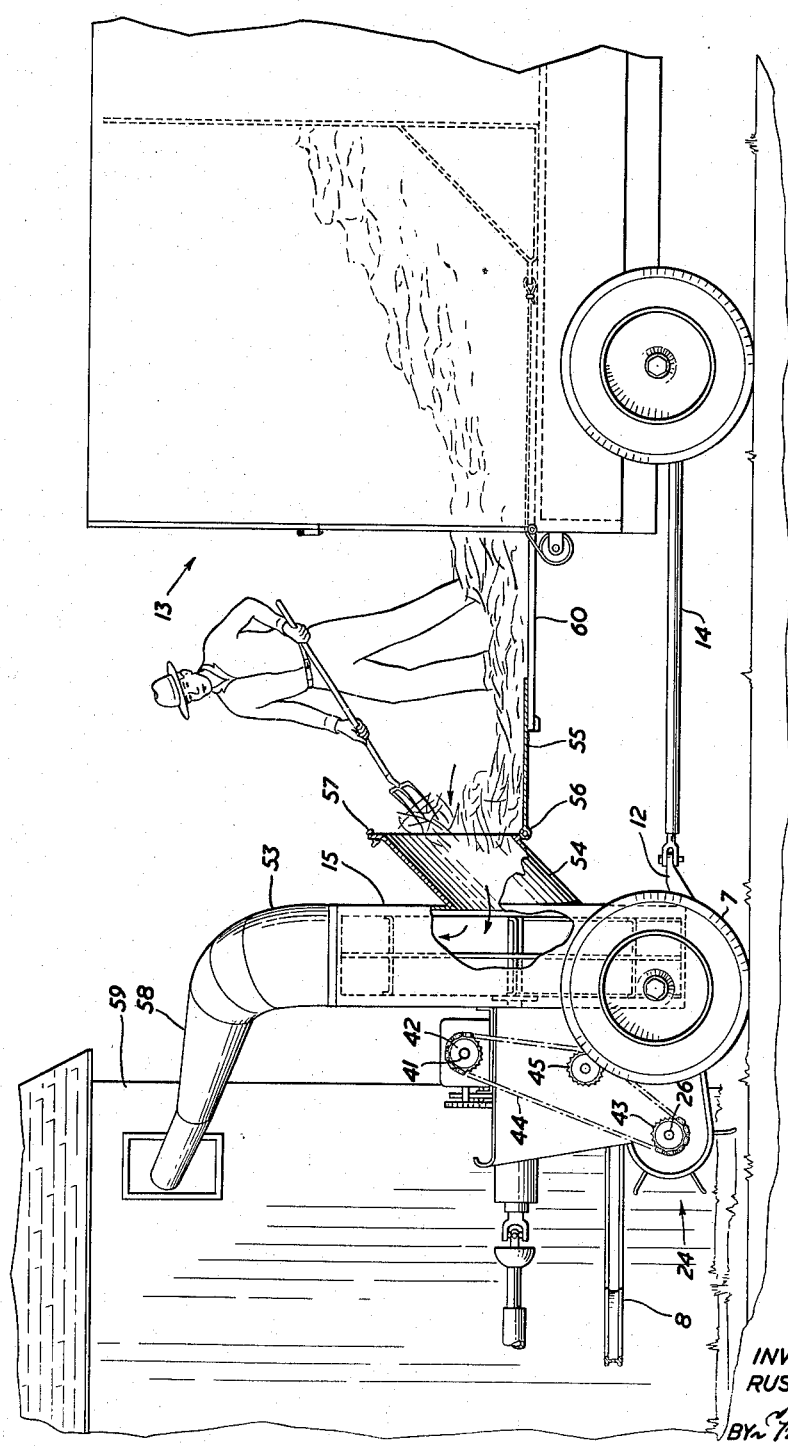
Fig. 3 is a side elevation similar to Fig. 1 showing the machine in its use as an unloader.

The rear side of the blower fan casing indicated at 17 has the usual unloading intake or inlet 54 in the form of a duct which communicates with the interior of the casing and extends upwardly at a suitable angle in the form of a short duct. The intake provides a passage leading to the chamber of the fan casing for introducing material therein from the portable storage receptacle 13 in an unloading operation as will be well understood in the art. Some means is supplied to close off the passage of the intake 54 when the machine is used in a loading operation as depicted in Figure 1. In the drawing there is shown a flap 55 for this purpose which fits over the mouth of the duct and is hinged at its lower side as at 56. At its top there is provided some suitable form of catch indicated at 57 to maintain the flap in closed condition and to permit it to be opened as occasion may require. From the preceding description it will be manifest that in using the harvesting machine as a loader— see Fig. 1—it is drawn by a tractor to which it is connected and hay or other material is picked up by the pick-up device and carried to the loading side of the blower fan and fed thereto with the assistance of the screw conveyors. The elevated material is delivered by the duct 52 to the portable storage receptacle in the form of the wagon 13. In this use of the machine the unloading intake 54 is closed by means of the flap 55 and the unloading blades assist by creating an air blast which makes the operation very efficient. In the use of the harvesting machine for performing unloading operations such as that depicted in Fig. 3, the discharge duct indicated at 58 is directed to a stationary storage receptacle such as the barn denoted at 59 and the flap 55 on the unloading intake is opened and allowed to rest on the tailboard 60 of the wagon 13 as customary in order that the operator may fork the material from the receptacle into the unloading intake 54. The material as it is fed into the blower fan is caught up by the set of unloading blades and discharged through the duct 58. The simplicity of the dual functions of the machine will be apparent and it will be manifest that there is provided a highly efficient and serviceable machine which is inexpensive to manufacture.

It is to be understood that such modifications and variations may be resorted to as fairly come within the scope of the appended claims.

What I claim is:

1. In a harvesting machine for picking up and conveying a crop, a vehicular support frame having forward and rear ends, power-driven crop pickup means mounted on the forward end of said frame, rearwardly converging enclosure means on said frame and extending rearwardly from said pickup means, power-driven conveyor means mounted within and on opposite sides of said enclosure means for urging crops centrally thereof as they move into said enclosure means, and power-driven impeller means mounted on said frame and including a casing having an inlet opening in communication with said enclosure whereby crops are drawn from said conveyor means into said casing, said casing including a peripheral discharge opening from which crops are centrifugally discharged, said pickup means comprising crop pickup means journaled on a transverse axis of rotation on said frame and including a horizontal shield forming a bottom portion of said enclosure means, said enclosure means including side and top shields, said conveyor means comprising mutually reversed screw conveyors projecting laterally from opposed inner surfaces of said side shields and terminating short of each other adjacent said inlet opening, whereby suction created by said impeller means draws crops from said screw conveyors into the casing, said casing extending transversely of said support frame, said impeller including blades in said casing on an axis of rotation extending longitudinally of said frame.

2. The combination of claim 1; said casing including front and rear sides, said inlet being formed in said front side, a second inlet opening into said rear side, said impeller blades comprising a plurality of radially extending blades, a disk extending intermediately of said blades in a plane normal to the axis of rotation thereof and defining forward and rear sub-chambers respectively communicating with said first mentioned and second inlets, the peripheral discharge communicating with both of said sub-chambers.

3. The combination of claim 1; and a trailing vehicle connected to said vehicular frame and including a portion for receiving crops from said peripheral discharge, and means on said trailing vehicle facilitating unloading the same whereby crops may be deposited into said second inlet.

References Cited in the file of this patent

UNITED STATES PATENTS

| | | |
|---|---|---|
| 2,127,985 | Philpott | Aug. 23, 1938 |
| 2,513,966 | Pool et al. | July 4, 1950 |
| 2,548,329 | Van Sickle | Apr. 10, 1951 |
| 2,630,664 | Hansen | Mar. 10, 1953 |
| 2,641,097 | Mast | June 9, 1953 |
| 2,745,237 | Elliott | May 15, 1956 |
| 2,796,722 | Hanford et al. | June 25, 1957 |

FOREIGN PATENTS

| | | |
|---|---|---|
| 466,100 | Canada | June 27, 1950 |